United States Patent
Wu et al.

(10) Patent No.: US 9,566,677 B2
(45) Date of Patent: Feb. 14, 2017

(54) MOTOR VEHICLE PANEL BLANKING METHOD AND SYSTEM

(75) Inventors: Ruimin Wu, Shanghai (CN); Wenhai Jin, Shanghai (CN); Qi Yan, Shanghai (CN); Chengguo Jin, Shanghai (CN); Saidan Yang, Shanghai (CN); Yuming Wang, Shanghai (CN); Junliang Qiao, Shanghai (CN); Shengbo Pan, Shanghai (CN); Changqing Lv, Shanghai (CN)

(73) Assignee: Baoshan Iron & Steel Co., Ltd. (CN)

( * ) Notice: Subject to any disclaimer, the term of this patent is extended or adjusted under 35 U.S.C. 154(b) by 95 days.

(21) Appl. No.: 14/130,375

(22) PCT Filed: Mar. 8, 2012

(86) PCT No.: PCT/CN2012/072087
§ 371 (c)(1),
(2), (4) Date: Feb. 26, 2014

(87) PCT Pub. No.: WO2013/131266
PCT Pub. Date: Sep. 12, 2013

(65) Prior Publication Data
US 2015/0020358 A1   Jan. 22, 2015

(51) Int. Cl.
*B23K 26/38* (2014.01)
*B23P 23/06* (2006.01)
(Continued)

(52) U.S. Cl.
CPC ............ *B23P 23/06* (2013.01); *B23K 26/0093* (2013.01); *B23K 26/083* (2013.01);
(Continued)

(58) Field of Classification Search
CPC ..... B23K 26/00; B23K 26/14; B23K 26/0838; B23K 26/38; B23K 37/0461; B23K 37/0235; B23K 2201/18; B23P 23/06; B25J 11/005; B25J 11/0055
See application file for complete search history.

(56) References Cited

U.S. PATENT DOCUMENTS

| 4,796,341 A * | 1/1989 | Kuhn, II ................... B23C 3/12 |
| | | 198/413 |
| 2002/0005056 A1 | 1/2002 | Pick |

(Continued)

FOREIGN PATENT DOCUMENTS

| CN | 2930919 Y | 8/2007 |
| CN | 102259240 A | 11/2011 |

(Continued)

OTHER PUBLICATIONS

International Search Report for PCT/CN2012/072087, dated Dec. 20, 2012, 4 pages.

*Primary Examiner* — Brian Jennison
(74) *Attorney, Agent, or Firm* — Hovey Williams LLP

(57) ABSTRACT

The present invention discloses a method of motor vehicle sheet blanking and a system of the same, wherein the blanking method comprises: firstly, nesting for motor vehicle sheet material, and cutting it into group sheets with a shape and size confirmed by the multi length of the sheet; next, designing a backing die depending on scraps to be cut from the group sheet, and hollowing in areas corresponding to blanking openings in the backing die, in which the dimensions of the blanking openings are greater than that of the actual scraps to be cut; then, placing a group sheet onto the backing die; laser cutting the group sheet based on the shape of motor vehicle sheet, the cut scraps dropping through the blanking openings in the backing die onto a scrap conveyor belt underneath; stacking the cut sheets. The present invention can effectively process scraps cut from sheets and improve the blanking efficiency.

15 Claims, 3 Drawing Sheets

(51) Int. Cl.
  *B23K 26/08* (2014.01)
  *B23K 26/00* (2014.01)
  *B25J 11/00* (2006.01)
  *B65G 57/04* (2006.01)

(52) U.S. Cl.
  CPC .......... *B23K 26/0884* (2013.01); *B23K 26/38* (2013.01); *B23K 26/702* (2015.10); *B25J 11/005* (2013.01); *B25J 11/0055* (2013.01); *B65G 57/04* (2013.01); *B23K 2201/006* (2013.01); *B23K 2201/18* (2013.01); *Y10S 901/16* (2013.01); *Y10S 901/40* (2013.01); *Y10T 29/49764* (2015.01)

(56) References Cited

U.S. PATENT DOCUMENTS

| | | | |
|---|---|---|---|
| 2002/0134209 A1 | 9/2002 | Burman et al. | |
| 2010/0122970 A1 | 5/2010 | Caristan | |
| 2010/0122971 A1* | 5/2010 | Caristan | B23K 26/0838 219/121.72 |
| 2010/0181165 A1* | 7/2010 | Finn | B23K 26/0838 198/339.1 |

FOREIGN PATENT DOCUMENTS

| | | |
|---|---|---|
| CN | 102452002 A | 5/2012 |
| JP | 200754835 | 3/2007 |

\* cited by examiner

MOTOR VEHICLE PANEL BLANKING METHOD AND SYSTEM

RELATED APPLICATION

The present application is a national stage application under 35 U.S.C. §371 of International Application No. PCT/CN2012/072087, filed Mar. 8, 2012, which is incorporated by reference herein in its entirety.

FIELD OF THE INVENTION

The present invention relates to the field of automobile manufacturing technology, and in particular to a method of motor vehicle sheet blanking and a system of the same.

BACKGROUND OF THE INVENTION

The traditional way of motor vehicle sheet blanking is die blanking, the equipments for which include a transfer unit, a press unit and a stack unit. Usually, sheets of a simple shape (such as rectangular, trapezoid and arc) can be cut out by a swing shear, while sheets with complicated profiles should be made by die blanking. A die blanking line is required to be provided with different blanking dies corresponding to the sizes and shapes of specific motor vehicle sheets such that various sheets can be produced by changing the dies.

The blanking line for motor vehicle sheet is of high production efficiency, at 4-6 million pieces per year. Calculating by 3800 hours per year, the production is 25 pieces per minute.

With the rapid development of high power laser technology, many academic institutions and manufacturers begin the research of blanking for motor vehicle sheets based on fiber laser. Both of Automatic Feed Company in USA and Air Liquide in France have, in the publication information, published the motor vehicle sheet blanking technology based on laser cutting. The solution of the former company puts forward two blanking modes on basis of laser technology: one is strip continuous-feed blanking, and the other is step blanking.

1. Strip Continuous-Feed Blanking

Nesting the sheets, and according to the number n of the provided laser cutting heads, dividing the cutting line of each sheet into n segments on average; when the sheet enters a first cutting region, cutting along a first part of line segment or curve such as one semi-circle; when the sheet enters a second cutting region, cutting along a second part of the line segment or curve such as the other semi-circle, with circle scraps falling onto a scrap belt underneath; when the sheet enters a third cutting region, cutting along a third part of the line segment or curve, with edge scraps falling onto the scrap belt underneath; when the sheet enters a fourth cutting region, cutting along a fourth part of the line segment or curve, with edge scraps falling onto the scrap belt underneath; after the sheet passes through the pinch rollers, the fifth cutting head cuts transversely the last connecting parts between sheets; the sheets come into a stacking region and get stacked.

2. Step Blanking

Nesting the sheets; cutting the strip into group sheets, and transferring them into a cutting position; a group sheet enters the cutting region and stops; adjusting longitudinally the two groups of conveyor rollers before and after the cutting position until the shape of scrap is cut out; when finishing the cutting of the first area of the sheet, scraps fall into a scrap conveyor belt; the sheet moves into a second cutting area and stops; adjusting the two groups of transfer rollers before and after the cutting position longitudinally until the shape of scrap is cut out; when finishing the cutting of the second area of the sheets, scraps fall into the scrap conveyor belt; the sheet moves into a third cutting area and stops; adjusting the two groups of transfer rollers before and after the cutting position longitudinally until the shape of scrap is cut out; when finishing the cutting of the third area of the sheets, scraps fall into the scrap conveyor belt; after the sheet is cut, it is transferred into a stacking region through a conveying device. The subsequent sheets are cut in the same way.

Additionally, Air Liquide proposes a scrap blanking solution with transverse backing and adjustment for sheets.

Automatic Feed Company together with Air Liquide proposes a technical solution of step-type laser blanking, which generally adopts the layout of Air Liquide and the scrap processing by longitudinal adjustment of Automatic Feed Company. In this solution, 3 robots with a seventh shaft are utilized to transfer group sheets and finished sheets, and to stack sheets. 5 laser cutting units are provided, two of which is used for making group sheets, and another three for cutting single sheets in different areas. Besides, there are further two stations as buffering stations for discharging scraps.

In the traditional swing shear blanking, the front end of a sheet is free of clamping or fixing, and the back end thereof is transferred by pinch rollers in a stepping way. The base of the sheet is supported by wheels, and during blanking, a return lock device is used.

As for the strip conveyance with continuous blanking proposed by Automatic Feed Company, there are provided with pinch rollers at both front and back ends in the cutting region, and sheets are fed continuously at a preset speed. Under the sheets there is provided with a scrap conveyor device, onto which the cut scraps fall. The last cut is performed after the pinch rollers at the back end.

The technical problems of the conveying way above cover the following aspects.

1. Shape cutting is based on speed control strategy

Conventionally, the displacement control strategy is used for cutting operation with high requirements on dimension and form errors, so as to guarantee the geometric accuracy of the shape. However, in the continuous blanking of Automatic Feed Company, the speed control strategy is utilized, which is on the basis that the speed of the pinched sheets is precise and the Cartesian coordinate robots are cutting according to the predetermined traces and speeds. The speed deviation of the pinch rollers and the sheets may bring about errors of cut shapes, which in turn, results in that the kerfs cannot to be engaged together, and the scraps cannot drop. As a lot of cutting machines are working at the same time, even if using a speed measuring device (for example, a laser velocimeter), it is still difficult to ensure the kerfs made from the different cutting machines to be engaged well.

2. Three equipments have the same linear speed. The solution of Automatic Feed Company requires that the speeds of the pinch rollers and the two circular pin-type conveyor belt which support sheets before and after the pinch rollers, should be the same, otherwise the pin-type support parts on the belt may scrape the sheets.

3. The pins on the pin-type conveyor belts are prone to being cut, and little scraps cut from sheets may get stuck in the conveyor belt.

4. The sheet shape in the cutting region cannot be guaranteed.

When continuously conveyed and cut, the sheets are present in the cutting regions. In this solution, there are three cutting regions and in addition, a cutting-off region after the pinch rollers, in each of which a different area of the sheet is cut. The sheets assume a state of being pinched and tensioned, but there is great difference among transverse tensions at different segments in a sheet, resulting in that the sheet shape in the cutting region cannot be guaranteed, thereby affecting the cutting quality. When cutting, the distance between the cutting head and the sheet surface is 0.5 mm~1 mm.

5. It is difficult for the sheets to pass through the back pinch rollers.

When a sheet is passing through the back pinch rollers during continuous feeding and cutting, it is not only prone to straining the pinch rollers, but also causing sheets stuck or even broken.

6. Off-center sheets affect shape cutting.

Due to that the sheets are transferred through pinch rollers and the distance between two sheets is above 10 m, the off-center phenomenon may lead to making batches of waste product in cutting operation. Thus, in the solution there must be a centering device.

7. High requirement on the engagement of the kerfs

For the reason that the sheets are cut by a plurality of cutting machines in different regions, it is necessary for the latter cutting to engage with the former kerfs, so as to ensure scraps to drop. As the kerfs engagement is performed when the sheets are moving, there are high requirements on the movement of the pinch rollers, the stepping progress of the robots and the shape of the sheet, thereby it costs a lot on the technology and equipments.

8. Cutting along the trace of a sheet is performed in relative movement.

While the cutting devices are Cartesian coordinate robots with 3 degrees of freedom, owing to that sheets move in a single direction, it is hard to cut along the trace of the sheet or it needs a large quantity of empty stroke to guarantee.

9. The malfunction of a single cutting machine may cause the whole production line to halt.

As one sheet is cut by different cutting machines on different areas thereof, the malfunction of one of the cutting machines may affect the operation of the whole production line. When one cutting machine breaks down, if it is needed to finish the work of the production line, a complicated cutting control strategy and a hardware technology have to be utilized for cutting in the abnormal situation.

The laser step blanking solution proposed by Automatic Feed Company and Air Liquide together is better on operability than the continuous blanking solution proposed by Automatic Feed Company, while the difficulty thereof is the scrap blanking and the yield during unit time of the whole production line.

SUMMARY OF THE INVENTION

The objective of the present invention is to provide a motor vehicle sheet blanking method and system which can process scraps effectively, so as to improve the blanking efficiency.

To achieve the aforementioned objective, the present invention provides a technical solution which is:

a method of motor vehicle sheet blanking, comprising, firstly, nesting for motor vehicle sheet material, and cutting it into group sheets with a shape and size confirmed by the multi length of the sheet; next, designing a backing die depending on scraps to be cut from the group sheet, and hollowing in areas corresponding to blanking openings in the backing die, wherein the dimensions of the blanking openings are greater than that of the actual scraps to be cut; then, placing the group sheet onto the backing die; laser cutting the group sheet based on the shape of motor vehicle sheet, the cut scraps dropping through the blanking openings in the backing die onto a scrap conveyor belt underneath; stacking the cut sheets.

Furthermore, after a group sheet is formed, transferring the group sheet from the group sheet conveyor chain onto the backing die of the cutting unit; cutting the sheet with the cutting machines of the cutting unit, the scraps dropping through the blanking openings in the backing die onto a scrap chute and sliding onto a scrap conveyor belt; after a single sheet is cut, stacking the cut sheets by stacking robots.

Additionally, the backing die is designed with 4 sheets for a group, or according to the operation length of the whole production line, 6 sheets for a group.

Moreover, one transfer robot is provided respectively at each side of the two sides of the group sheet conveyor chain, and two cutting units are provided respectively at each side of the two sides of each transfer robot; stacking robots are provided beside each cutting unit.

The transfer robots use vacuum suckers to pick up or place group sheets.

The backing die is formed and positioned directly on the cutting unit.

A motor vehicle sheet blanking system according to the present invention, which comprises: a group sheet conveyor chain; at least one transfer robot, provided at one side of the group sheet conveyor chain; at least one cutting unit, at one side of the transfer robot; the cutting unit being provided with at least one laser cutting machine; the cutting unit being provided with a stacking robot at a side thereof; a backing die provided in the cutting unit, in which blanking openings are formed by hollowing in areas corresponding to scraps, and the dimensions thereof are greater than that of the actual scraps to be cut; a scrap chute disposed underneath the backing die of the cutting unit, and a scrap conveyor belt provided corresponding to the scrap chute.

Furthermore, there is one transfer robot on each side of the two sides of the group sheet conveyor chain, and two cutting units on each side of the two sides of the transfer robot, thus forming 4 cutting units; each cutting unit is provided with two laser cutting machines, and provided with two stacking robots at a side thereof.

The laser cutting machines are Cartesian coordinate robots which are movable in the longitudinal and transverse directions. The two laser cutting machines have a common operation area in the longitudinal direction.

The advantages of the present invention are:

The present invention uses laser to cut off scraps; it is different from the continuous or stepping blanking proposed by Automatic Feed Company and Air Liquilde, and there is no need for the group sheet conveyor belt to carry scraps and no need to adjust dynamically the length of an expandable receiving conveyor belt, for the reason that the present invention cuts off the scraps on a sheet backing die. The present invention uses a single Cartesian coordinate robot to cut a single sheet, which avoids the various problems caused by the kerfs engagement and cutting accuracy in the solution of Automatic Feed Company and Air Liquide.

The present invention features flexibility and independency, in which the whole production line is not affected by the breakdown of a single set of cutting equipment. In case of malfunction, it is only needed to separate automatically or manually the broken-down cutting equipments from the cutting region.

DETAILED DESCRIPTION OF THE INVENTION

Figure 1:
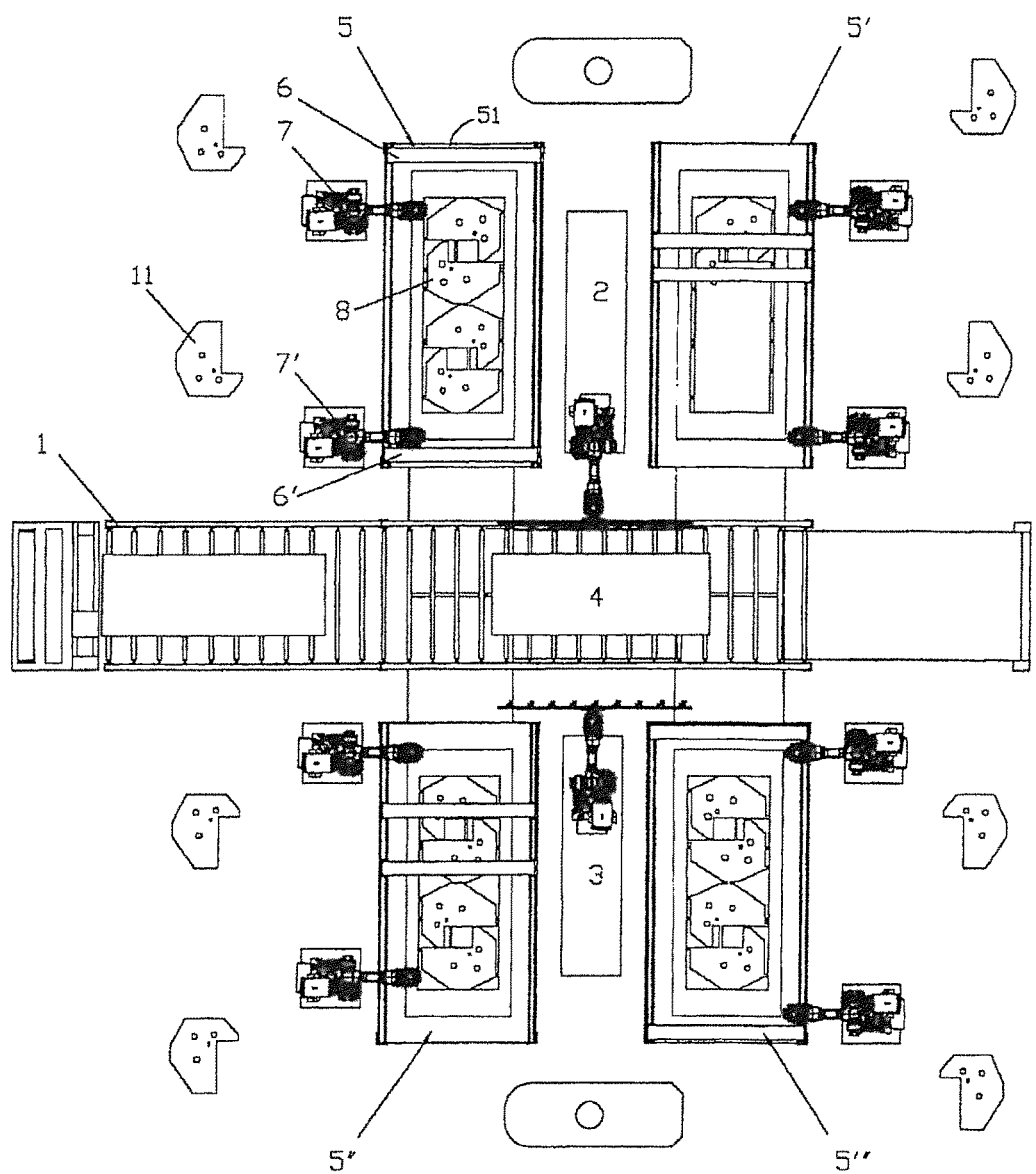
FIG. 1 is the top plan view of an embodiment of the motor vehicle sheet blanking system according to the present invention.
Figure 2:
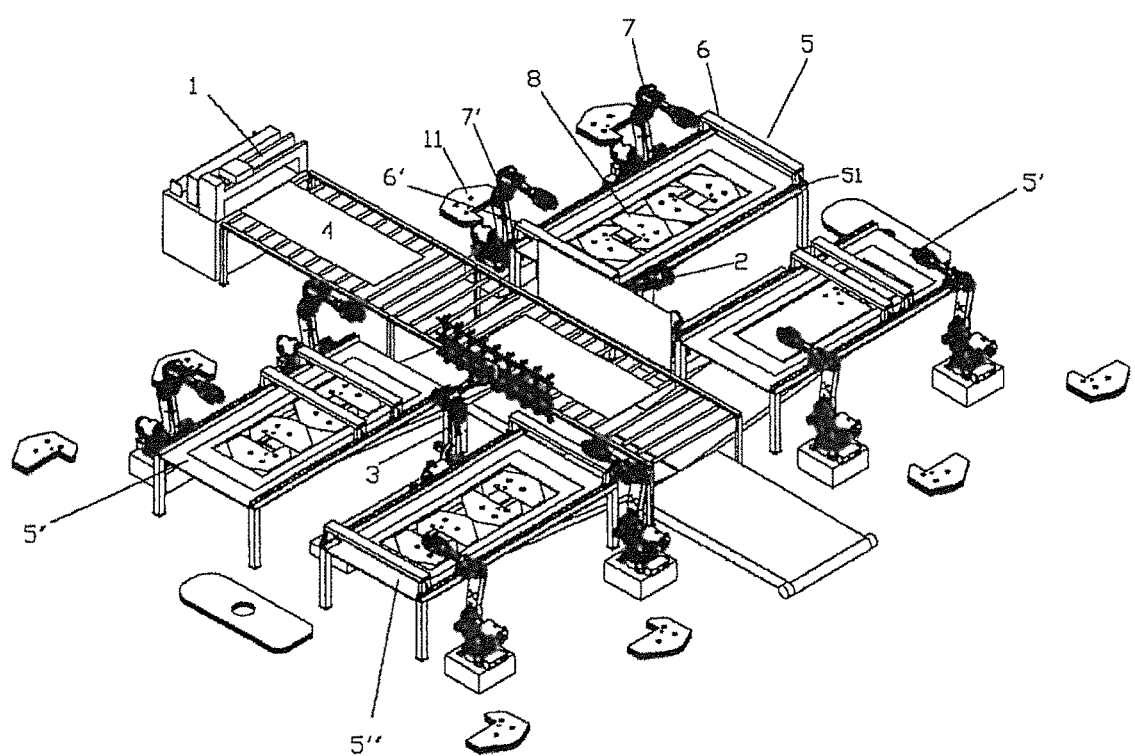
FIG. 2 is the perspective view of the embodiment according to the present invention.
Figure 3:
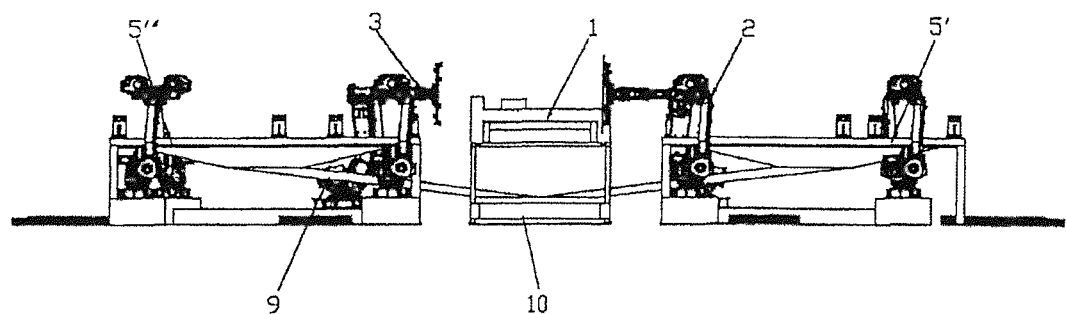
FIG. 3 is the side view of the embodiment in FIG. 2.
Figure 4:
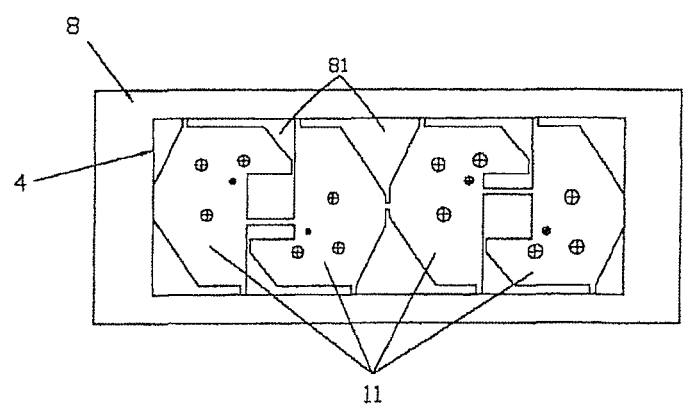
FIG. 4 the diagram of a backing die according to the present invention.

Referring to the accompany drawings, FIG. 1 to FIG. 4 show one embodiment according to the present invention. In this embodiment, the motor vehicle sheet blanking system includes a group sheet conveyor chain 1; two transfer robots 2 and 3 which are provided respectively at two sides of the group conveyor chain 1; four cutting units 5, 5', 5" and 5'" which are located respectively at the sides of the transfer robots 2 and 3; two laser cutting machines 6 and 6' provided in the cutting unit 5 (herein, taking the cutting unit 5 as an example and other cutting units having a similar configuration); two stacking robots 7 and 7' beside the cutting unit 5 (herein, taking the cutting unit 5 as an example, and other cutting units having a similar configuration, similarly hereinafter); a backing die 8 provided on the cutting unit 5, in which blanking openings 81 are formed by hollowing in areas corresponding to scraps and the dimensions of the blanking openings are greater than that of the actual scraps, and onto which the group sheet 4 formed by nesting is placed; a scrap chute 9 disposed beneath the backing die 8 of the cutting unit 5; a scrap conveyor belt 10 disposed corresponding to the scrap chute 9.

The laser cutting machines 6 and 6' are Cartesian coordinate robots, which can move in the longitudinal and transverse directions, and also, have a common working area in the longitudinal direction.

The group sheet is cut according to the actual nesting result. The embodiment is based on the sheet of interior rear door panel of GM D06 and the group sheet 4 herein consists of four joint sheets 11.

The backing die 8 is designed based on the layout of the four joint sheets 11 and the scraps expected to be cut, and blanking openings 81 are formed on the backing die 8 by hollowing in areas corresponding to the scraps. The backing die can be directly cut to shape on the cutting unit, and be positioned thereon. The blanking openings need to be further processed for scraps dropping conveniently and the dimensions thereof should be greater than that of the actual cut scraps.

The group sheet is conveyed by the conveyor chain 1 into the preset position for two transfer robots 2 and 3 to pick up. The two transfer robots 2 and 3, on basis of a certain working strategy, pick up the sheets, place them onto the backing dies of the four cutting units 5, 5', 5" and 5'" and position them.

It is vacuum suckers that the two transfer robots 2 and 3 use for picking up and placing the materials.

Each cutting unit 5 includes a base frame 51, a blanking die 8, two laser cutting machines 6 and 6' in the form of Cartesian coordinate robot.

The longitudinal stroke of the two laser cutting machines in the form of Cartesian coordinate robot covers two sheet cutting regions. They have a common working area in the longitudinal direction.

Each cutting unit is configured with a set of stacking unit, which includes two stacking robots and two, four or six stack positions. The stacking robots use vacuum suckers to pick up sheets and the stacking strategy is: large sheets are picked up and stacked one by one; small sheets are picked up and stacked more than one at a time, in which the position of the sucker is adjustable dynamically, and finally sheets are stacked for piles; while cutting, the picking up and stacking operations are performed, that is, upon finishing cutting, the stacking robots are allowed to pick up and stack.

The procedure of laser blanking is as follows:

The transfer robot 2 picks up a first group sheet 4 from the conveyor chain 1, transfers and places it on the backing die 8 of the cutting unit 5, while the laser cutting machines 6 and 6' is at the two sides of the cutting base frame 51.

The laser cutting machines 6 and 6' begin to cut the group sheet according to the preset cutting strategy and the working trace; they move along the same direction, one of which starts from one end of the base frame, and another from the middle portion thereof. The laser cutting machines 6 and 6' work for the same quantity. A single piece is cut by a single laser cutting machine, and tailor-welded edges can be cut out with one pass.

When a second group sheet reaches the picking position, the transfer robot 3 picks it up, transfers and places it onto the blanking die of the cutting unit 5". Two laser cutting machines of the cutting unit 5" begin to cut the group sheet according to the preset cutting strategy and the working trace;

When a third group sheet reaches the picking position, the transfer robot 2 picks it up, transfers and places it onto the blanking die of the cutting unit 5'. Two laser cutting machines of the cutting unit 5' begin to cut the group sheet according to the preset cutting strategy and the working trace;

When a fourth group sheet reaches the picking position, the transfer robot 3 picks it up, transfers and places it onto the blanking die of the cutting unit 5'". Two laser cutting machines of the cutting unit 5'" begin to cut the group sheet according to the preset cutting strategy and the working trace;

After completing the cutting of the single or multi sheets, the corresponding stacking robots of each cutting unit, for instance, the stacking robots 7 and 7' corresponding to the cutting unit 5, may pick up and stack the sheets.

When the cutting unit 5 finishes the cutting and stacking operation, the laser cutting machines 6 and 6' move respectively to the two sides of the base frame. The transfer robots 2 transfers the fifth group sheet onto the backing die of the cutting unit 5, and the laser cutting machines 6 and 6' start to cut again.

That cycle repeats, i.e. a sixth group sheet is transferred onto the cut unit 5"; a seventh group sheet is transferred onto the cut unit 5'; an eighth group sheet is transferred onto the cut unit 5'".

As the present invention arranges the cutting units at the two sides of the group sheet chain and combines with transfer robots and stacking robots, the whole production line features flexibility and independency, and is free of the impact from the breakdown of a single set of cutting equipment. In case of malfunction, it is only needed to separate automatically or manually the broken-down cutting equipment from the cutting region.

The invention claimed is:

1. A method for cutting blanks for a motor vehicle from sheet material, comprising;
   cutting the sheet material into group sheets each with a shape and size to accommodate multiple ones of the motor vehicle blanks nested together;
   providing a backing die and cutting blanking openings in the backing die that are shaped to correspond to and are positioned to receive scraps to be cut from the group sheets, wherein the dimensions of the blanking openings are greater than that of the scraps to be cut;
   conveying the group sheet on a group sheet conveyor chain to a preset position and then removing the group sheet from the group sheet conveyor chain and placing the group sheet onto the backing die while the backing die is in a stationary position;
   laser cutting the group sheet while on the stationary backing die having the blanking openings to create the multiple ones of the motor vehicle blanks and the scraps, the cut scraps dropping through the blanking openings in the backing die and onto a scrap conveyor belt underneath; and
   stacking the cut motor vehicle blanks.

2. The method according to claim 1, wherein stacking robots are used during said stacking of the cut motor vehicle blanks.

3. The method according to claim 1, wherein in said step of laser cutting the group sheet either four or six motor vehicle blanks are created from the group sheet.

4. The method according to claim 2, including providing a transfer robot at each of two sides of the group sheet conveyor chain, providing a cutting unit at each of two sides of each transfer robot, and providing one of the stacking robots beside each cutting unit.

5. The method according to claim 4, wherein the transfer robots use vacuum suckers to pick up or place the group sheet.

6. The method according to claim 1, wherein one of the backing dies is formed and positioned directly on each of the cutting units.

7. A motor vehicle sheet blanking system, comprising:
   a group sheet conveyor chain;
   at least one transfer robot, provided at one side of the group sheet conveyor chain;
   at least one cutting unit, at one side of the transfer robot, the cutting unit being provided with at least one laser cutting machine, the cutting unit being provided with a stacking robot at a side thereof;
   a backing die provided in the cutting unit, in which blanking openings are formed by cutting out areas corresponding to intended locations of scraps that are formed when a group sheet is placed on the backing die having the blanking openings and is cut to form multiple motor vehicle blanks, the dimensions of the blanking openings being greater than that of the scraps;
   a scrap chute disposed underneath the backing die of the cutting unit; and
   a scrap conveyor belt associated with the scrap chute.

8. The motor vehicle sheet blanking system according to claim 7, including a transfer robot on each of two sides of the group sheet conveyor chain, and two cutting units on each of two sides of each one of the transfer robots, thus forming four cutting units, wherein each cutting unit is provided with two laser cutting machines and is provided with two stacking robots at a side thereof.

9. The motor vehicle sheet blanking system according to claim 7, wherein the laser cutting machines are in the form of Cartesian coordinate robots.

10. The motor vehicle sheet blanking system according to claim 8, wherein the laser cutting machines are Cartesian coordinate robots, which are movable in the longitudinal and transverse directions, and the two laser cutting machines have a common operation area in the longitudinal direction.

11. The motor vehicle sheet blanking method according to claim 2, wherein in said step of laser cutting the group sheet either four or six motor vehicle blanks are created from the group sheet.

12. The motor vehicle sheet blanking method according to claim 2, wherein a transfer robot uses vacuum suckers to remove the group sheet from the group sheet conveyor chain and place it on the backing die.

13. The motor vehicle sheet blanking method according to claim 4, wherein the transfer robots use vacuum suckers to pick up or place the group sheet.

14. The motor vehicle sheet blanking method according to claim 2, wherein one of the backing dies is formed and positioned directly on each of the cutting units.

15. The motor vehicle sheet blanking system according to claim 8, wherein the laser cutting machines are in the form of Cartesian coordinate robots.

* * * * *